J. H. McMinn.
Mill-Spindle.
No. 72661. Patented Dec. 24, 1867.
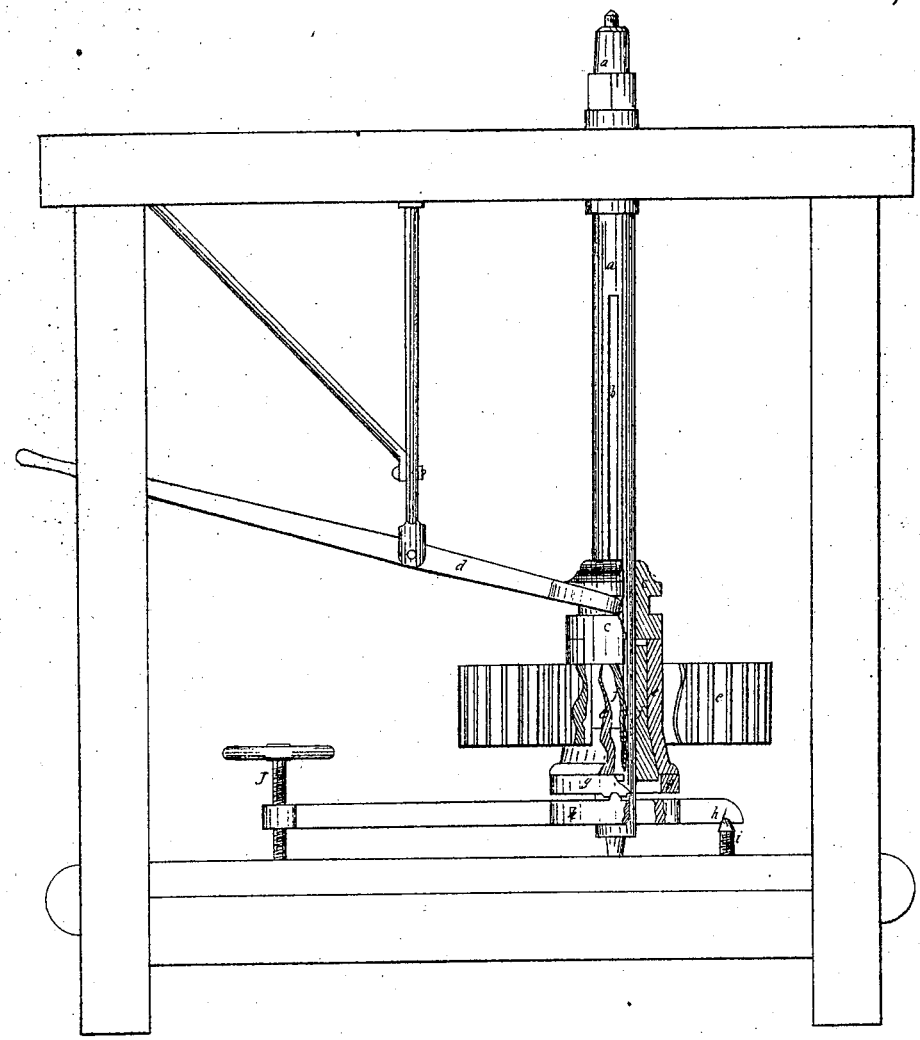
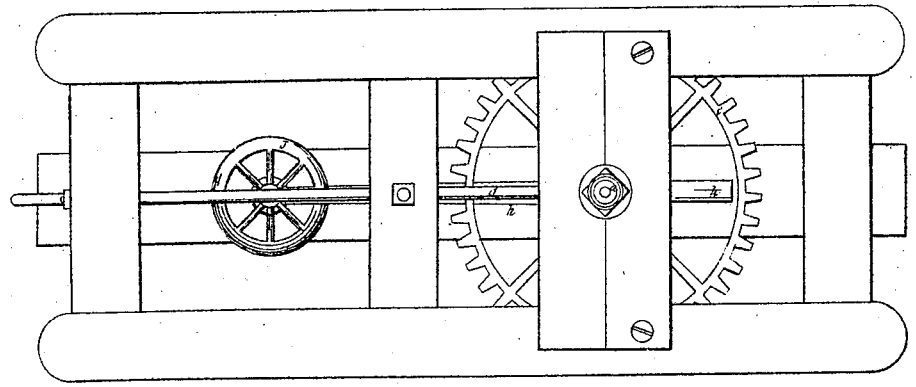
Witnesses:
Inventor:

United States Patent Office.

J. H. McMINN, OF LOGANSPORT, INDIANA. (THEODORE J. McMINN, ADMINISTRATOR.)

Letters Patent No. 72,661, dated December 24, 1867.

IMPROVEMENT IN MILL-SPINDLE.

*The Schedule referred to in these Letters Patent and making part of the same.*

TO ALL WHOM IT MAY CONCERN:

Be it known that I, J. H. McMINN, of Logansport, in the county of Cass, and State of Indiana, have invented a new and improved Mill-Spindle, or device for stopping and starting millstones without stopping machinery; and I do hereby declare that the following is a full, true, clear, and exact description of the same, reference being had to the accompanying drawings, making a part of this specification, in which—

Friction-cam $f$, fixed rigidly to spindle $a$, and hub of pinion $e$ made to fit the same, and resting upon bearing-ring $g$, the same being supported by a lever, $h$, which has a temper-screw, $s$, to raise or lower the pinion $e$. The grooved clutch $c$ is made to slide up or down by the forked lever $d$, and compelled to revolve with the spindle $a$ by the feather $b$.

When the clutch $c$ is thrown out of gear, the pinion $e$ is allowed to revolve on the friction-cone $f$, with a greater or less amount of friction, by the operation of the lever $h$, to gradually stop or start the spindle $a$, while the pinion $e$ continues to revolve with its usual volocity, thus allowing the miller to stop and take up a millstone, dress it, put it down again, and set it running, without stopping the other machinery of the mill.

Having thus described my invention, what I claim as new, and desire to secure by Letters Patent, is—

The mode of gradually starting or stopping millstones, substantially as set forth, by means of the following combination of parts, viz, the spindle $a$, cone $f$, pinion $e$, ring $g$, tempering-lever $h$, clutch $c$, and lever $d$.

J. H. McMINN.

Witnesses:
N. S. LA ROSE,
WILLARD G. NASH.